US012632870B1

(12) United States Patent
Williams et al.

(10) Patent No.: US 12,632,870 B1
(45) Date of Patent: May 19, 2026

(54) AUTOMATED TASK GENERATION FOR AUGMENTING ELECTRONIC COMMUNICATIONS AND TASK PERFORMANCE USING MACHINE LEARNING

(71) Applicant: United Services Automobile Association (USAA), San Antonio, TX (US)

(72) Inventors: Kristopher Thomas Williams, Helotes, TX (US); Jess Gingrich, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/929,007

(22) Filed: Oct. 28, 2024

Related U.S. Application Data

(60) Provisional application No. 63/594,237, filed on Oct. 30, 2023.

(51) Int. Cl.
    *G06Q 30/00*     (2023.01)
    *G06Q 30/015*     (2023.01)
    *G06Q 40/08*     (2012.01)

(52) U.S. Cl.
    CPC ........... *G06Q 30/015* (2023.01); *G06Q 40/08* (2013.01)

(58) Field of Classification Search
    None
    See application file for complete search history.

(56) References Cited

U.S. PATENT DOCUMENTS

2004/0260590 A1* 12/2004 Golani ................... G06Q 10/10
           705/7.26
2005/0171819 A1* 8/2005 Keaton .................. G06Q 30/02
           705/4
2006/0041659 A1* 2/2006 Hasan ................. H04L 41/0631
           709/224

(Continued)

OTHER PUBLICATIONS

Kouwenberg et al., Model Uncertainty and Exchange Rate Forecasting, The Journal of Financial and Quantitative Analysis, Feb. 2017, vol. 52, No. 1, pp. 341-363. (Year: 2017).*

*Primary Examiner* — Matthew T Sittner
(74) *Attorney, Agent, or Firm* — Fish & Richardson P.C.

(57) ABSTRACT

During an electronic communication between a customer and a service representative, a computer system receives data representing the electronic communication. Further, the computer system provides the data to a machine learning system that is configured to generate a node graph based on the data. The node graph includes a plurality of nodes, including: (i) a first node type representing one or more first tasks to be performed by the service representative while the electronic communication is occurring, and (ii) a second node type representing one or more second tasks to be performed by the service representative subsequent to the electronic communication, where interconnections between individual nodes among the plurality of nodes represent one or more dependencies between the respective interconnected nodes. Further, while the electronic communication is occurring, the computer system, causes at least a portion of the node graph to be presented to the service representative.

20 Claims, 7 Drawing Sheets

(56)  References Cited

U.S. PATENT DOCUMENTS

| | | | | |
|---|---|---|---|---|
| 2015/0161330 A1* | 6/2015 | Joao | ........................ | G16H 15/00 |
| | | | | 705/3 |
| 2018/0165284 A1* | 6/2018 | Mullins | ................... | G06F 16/93 |
| 2019/0190802 A1* | 6/2019 | Jalali | ..................... | H04L 67/104 |
| 2019/0311810 A1* | 10/2019 | Sevenster | .............. | G06N 5/022 |
| 2020/0053219 A1* | 2/2020 | Kim | .................... | G06F 3/04883 |
| 2020/0410378 A1* | 12/2020 | Williams | ................. | G06N 3/08 |
| 2021/0097140 A1* | 4/2021 | Chatterjee | .............. | G06N 3/044 |
| 2021/0200912 A1* | 7/2021 | Ploegert | ................. | G06Q 30/04 |
| 2021/0379489 A1* | 12/2021 | Thorborg | ................ | A63F 13/56 |
| 2022/0179910 A1* | 6/2022 | Bharathy | ............ | G06F 16/9024 |
| 2022/0383083 A1* | 12/2022 | Hirtzlin | .................. | G06N 3/048 |
| 2023/0319585 A1* | 10/2023 | Zhang | .................... | G06N 3/098 |
| | | | | 706/12 |
| 2024/0005181 A1* | 1/2024 | Chajewska | ............ | G06N 20/00 |

* cited by examiner

400

Initialize input data
402

Define input and output nodes
404

Divide Training Data Into Sets (Training, Test, and Validation)
406

Create interconnections between nodes and layers of nodes
408

Train neural network using training data
410

Validate neural network using validation data
412

Test neural network using test data
414

500

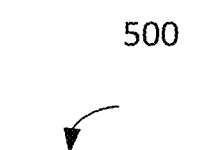

Receive, during an electronic communication between a customer and a service representative, data representing the electronic communication
502

Provide the data to a machine learning system that is configured to generate a node graph based on the data, wherein the node graph includes a plurality of nodes, including:
(i) a first node type representing one or more first tasks to be performed by the service representative while the electronic communication is occurring, and
(ii) a second node type representing one or more second tasks to be performed by the service representative subsequent to the electronic communication,
where interconnections between individual nodes among the plurality of nodes represent one or more dependencies between the respective interconnected nodes
504

Cause, while the electronic communication is occurring, at least a portion of the node graph to be presented to the service representative
506

FIG. 5

AUTOMATED TASK GENERATION FOR AUGMENTING ELECTRONIC COMMUNICATIONS AND TASK PERFORMANCE USING MACHINE LEARNING

CROSS-REFERENCE TO RELATED APPLICATION

This application claims priority under 35 U.S.C. § 119 to U.S. Application Ser. No. 63/594,237, filed on Oct. 30, 2023, and entitled "Automated Task Generation Using Machine Learning," the entire contents of which is incorporated by reference herein.

TECHNICAL FIELD

The disclosure relates to systems and methods for automatically generating data structures representing customer service-related tasks using machine learning.

BACKGROUND

An organization can provide support to its customers via electronic communications between the customers and service representatives of the organization. For instance, a service representative of the organization can receive a call from a customer, converse with the customer to identify a request by the customer, and perform tasks to fulfill the request.

SUMMARY

In general, an organization can provide support to its customers remotely. For example, the organization can provide a support center for conducting electronic communications (e.g., voice calls, video calls, etc.) with customers. During each communications session, a service representative for the organization can converse with a customer, identify requests by the customer, and perform tasks in accordance with the customer's requests.

In some implementations, at least some of the tasks can be performed by the service representative during the communications session (e.g., while the communications session is ongoing). In some implementations, at least some of the tasks can be performed by the service representative after the conclusion of the communications session. Further, the service representative can perform the tasks in a particular order.

Using machine learning, a computer system can monitor a communications session between a customer and a service representative and automatically identify tasks for augmented performance by the service representative to fulfill the customer's requests. Further, the computer system can automatically classify the tasks into different categories (e.g., tasks for performance during the communications session, tasks for performance after the conclusion of the communications session, etc.) and automatically determine an order for performing the tasks in an effective and efficient manner. Further still, the computer system can generate a data structure (e.g., a node graph) representing the tasks, the categories of the tasks, the order for performing the tasks, and/or interdependencies between the tasks, and present at least a portion of the data structure to the service representative for augmenting performance and more effectively completing tasks.

Further, the computer system can provide information regarding the tasks to the service representative during the communications session (e.g., in real time or approximately real time) to assist the service representative in efficiency fulfilling the customer's requests. For example, during the communications session, the computer system can present a user interface that identifies tasks for performance by the service representative, the order in which the tasks are to be performed, and whether the service representative should perform the tasks during the communications session or after the communications session has concluded. Further, during the communications session, the computer system can update the user interface during the course of the communications sessions (e.g., to indicate new tasks for performance by the service representative, a revised order for performing the tasks, etc.).

The implementations described in this disclosure can provide various technical benefits. For instance, the machine learning processes described herein enable a computer system to automatically identify tasks for performance by a service representative to fulfill a customer's request, and to identify an order for performing those tasks such that the request is fulfilled in an effective and efficient manner. Further, the computer system can automatically perform these tasks without manual human intervention, and using objective sets of rules or criteria that are particularly suitable for execution by a computer (e.g., rather than subjective sets of rules or criteria that might be considered by a human).

Further, the implementations described herein can reduce the amount of time that the customer and service representative are conversing with each other (e.g., compared to systems that do not include the features described herein), without negatively impacting the effectiveness of the service representative in fulfilling the customer's requests. Accordingly, the user experience of the customer is improved.

Further still, the implementations described herein can reduce the amount of resources consumed by a communications system of an organization. For example, to facilitate electronic communications between customers and service representatives, an organization expends certain computational resources, network resources, and power resources to establish and maintain each communications session. Further, communications sessions that are longer in length may consume a larger amount of computational resources, network resources, and/or power resources, compared to communications sessions that are shorter in length. Accordingly, in reducing the length of communications sessions (e.g., using the machine learning systems and processes described herein), an organization can reduce the resources consume by its communications systems, thereby improving the efficiency of its operation.

In an aspect, a method includes: receiving, by a computer system and during an electronic communication between a customer and a service representative, data representing the electronic communication; providing, by the computer system, the data to a machine learning system that is configured to generate a node graph based on the data, where the node graph includes a plurality of nodes, including: a first node type representing one or more first tasks to be performed by the service representative while the electronic communication is occurring, and a second node type representing one or more second tasks to be performed by the service representative subsequent to the electronic communication, and where interconnections between individual nodes among the plurality of nodes represent one or more dependencies between the respective interconnected nodes; and causing, by the computer system and while the electronic communication is occurring, at least a portion of the node graph to be presented to the service representative.

Implementations of this aspect can include one or more of the following features.

In some implementations, the data representing the electronic communication can include at least one of: an audio recording of at least a portion of the electronic communication, or a transcript of at least the portion of the electronic communication.

In some implementations, the electronic communication can be at least one of: a voice call, or a video call.

In some implementations, the node graph can include a plurality of first nodes including the first node type.

In some implementations, the node graph can include a plurality of second nodes including the second node type.

In some implementations, the machine learning system can be trained based on a plurality of sets of training data. A first set of training data from among the sets of training data can include: additional data representing an additional electronic communication between an additional customer and an additional service representative, and an additional node graph include a plurality of additional interconnected nodes, where each of the additional nodes represents a respective additional task performed by the additional service representative.

In some implementations, an interconnection of the plurality of additional nodes can represent one or more dependencies between the plurality of additional nodes.

In some implementations, the first set of training data can further include a metric representing an efficiency of the additional service representative in performing the additional tasks.

In some implementations, the first set of training data can further include a metric representing a satisfaction of the additional customer upon the additional service representative performing the additional tasks.

In some implementations, the first set of training data can further include a metric representing a length of time of the additional electronic communication.

In some implementations, the first set of training data can further include a metric representing a satisfaction of the additional customer during the additional electronic communication.

In some implementations, the first set of training data can further include a metric representing a satisfaction of the additional customer upon completion of the electronic communication.

In some implementations, the method can further include: receiving input from the service representative representing one or more modifications to the node graph, and training the machine learning system based on the input.

In some implementations, the one or more modifications can include at least one of: an addition of a node to the node graph, a deletion of a node of the node graph, or a rearrangement of the node graph.

In some implementations, the one or more modifications can include a re-labeling of one of the nodes of the first node type as the second node type.

In some implementations, the one or more modifications can include a re-labeling of one of the nodes of the second node type as the first node type.

In some implementations, the method can further include: generating, based on the data and the node graph, one or more questions directed to the customer regarding the one or more first tasks; and causing at least some of the one or more questions to be presented to the service representative.

In some implementations, the method can further include: determining, based on the data, that the customer has provided an answer to the one or more questions during the electronic communication, storing the answer, and modifying the node graph based on the answer.

In some implementations, modifying the node graph can include at least one of: indicating a completion of a task associated with a node of the node graph, deleting a node of the node graph, adding a node to the node graph, or rearranging the node graph.

In some implementations, the electronic communication can pertain to an insurance claim. The one or more first tasks and the one or more second tasks can be respective tasks in processing the insurance claim by the service representative.

In some implementations, the machine learning system can include a neural network. The neural network can include a plurality of neurons and a plurality of interconnections between the plurality of neurons. Each of the neurons can represent a respective numerical value. Each of the interconnections between the plural of neurons can represent a respective dependency between respective numerical values of respective interconnected neurons.

Other implementations are directed to systems, devices, and devices for performing some or all of the method. Other implementations are directed to one or more non-transitory computer-readable media including one or more sequences of instructions which when executed by one or more processors causes the performance of some or all of the method.

The details of one or more embodiments are set forth in the accompanying drawings and the description. Other features and advantages will be apparent from the description and drawings, and from the claims.

BRIEF DESCRIPTION OF DRAWINGS

FIG. 5 is a flow chart diagrams of an example process for generating tasks using machine learning.

DETAILED DESCRIPTION

Figure 1A:
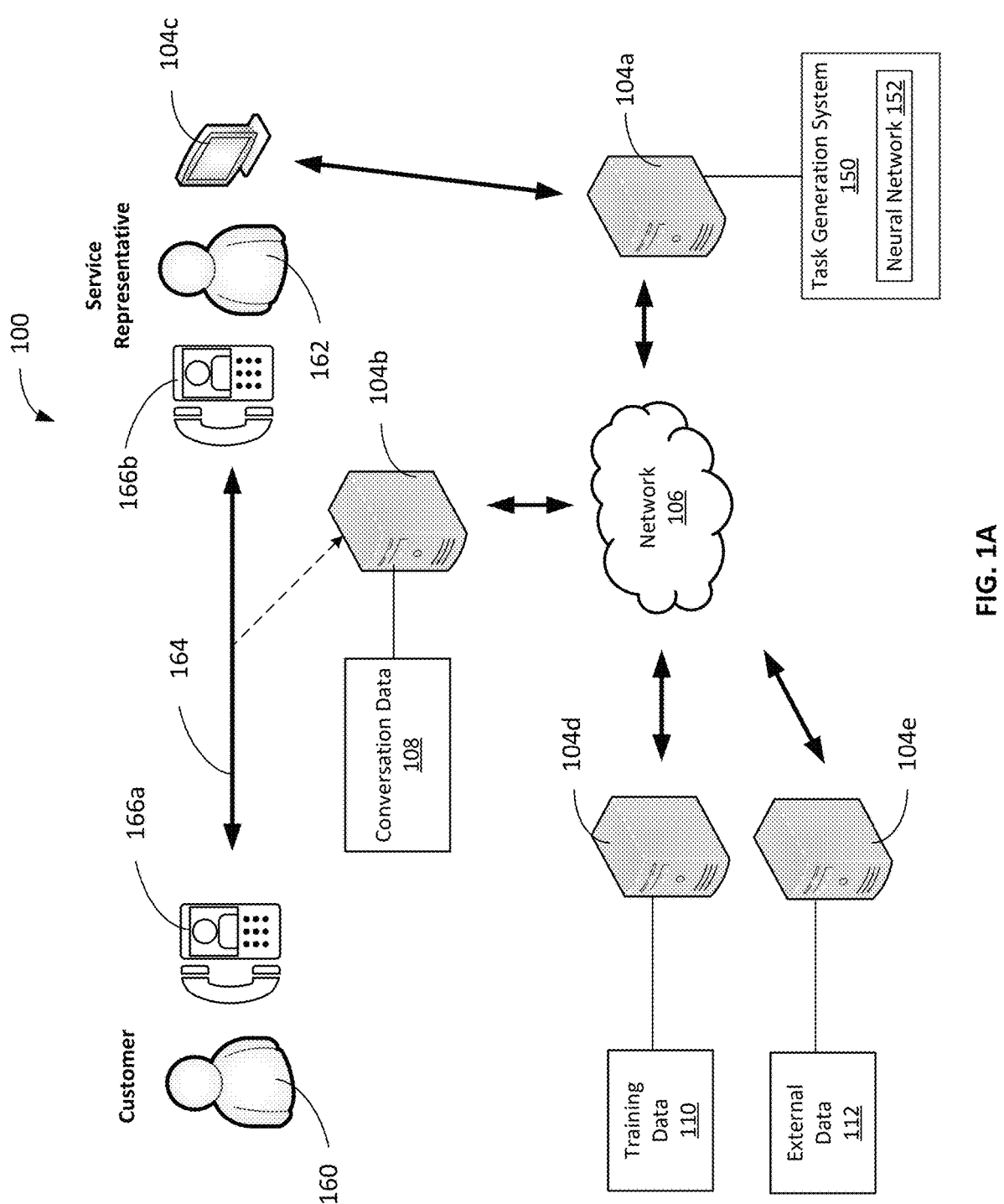
FIG. 1A is a diagram of an example system for generating tasks using machine learning.

In general, an organization can provide support to its customers remotely. For instance, an organization can provide a support center for conducting electronic communications (e.g., voice calls, video calls, etc.) with customers. During each communications session, a service representative for the organization can converse with a customer, identify requests by the customer, and perform tasks in accordance with the customer's requests.

Using machine learning, a computer system can monitor a communications session between a customer and a service representative and automatically identify tasks for performance by the service representative to fulfill the customer's requests. For example, the computer system can obtain data representing at least a portion of the conversation, and automatically identify a particular request made by the customer during the conversation. Further, the computer system can automatically identify one or more tasks for the service representative to perform to fulfill the request.

Further, the computer system can automatically classify the tasks into different categories. For example, the computer system can automatically identity tasks for the service representative to perform during the communications session (e.g., while the communications session is ongoing). As another example, the computer system can automatically identify tasks for the service representative to perform after the conclusion of the communications session.

Further, the computer system can automatically determine an order for performing the tasks in an effective and efficient manner. For example, the computer system can determine one or more dependencies between the tasks, and order the tasks such that any pre-requisites for completing a particular task are completed prior to beginning work on that task. For instance, a first task can include processing information in particular manner, and a second task can include further processing the information provided by the first task. The computer system can automatically order the first task prior to the second task, such that the first task is performed by the service representative prior to the second task.

Further still, the computer system can generate a data structure (e.g., a node graph) representing the tasks, the categories of the tasks, the order for performing the tasks, and/or interdependencies between the tasks, and present at least a portion of the data structure to the service representative. As an example, a node graph can include several nodes, each representing a particular task to be performed by a service representative. The spatial arrangement and/or sequence of the nodes on the node graph can indicate an order for performing the corresponding tasks. Further, interconnections between the nodes can indicate an interdependency between those nodes.

Further, the computer system can provide information regarding the tasks to the service representative during the communications session (e.g., in real time or approximately real time) to assist the service representative in efficiency fulfilling the customer's requests. For example, during the communications session, the computer system can present a user interface that identifies tasks for performance by the service representative, the order in which the tasks are to be performed, and whether the service representative should perform the tasks during the communications session or after the communications session has concluded. Further, during the communications session, the computer system can update the user interface during the course of the communications sessions (e.g., to indicate new tasks for performance by the service representative, a revised order for performing the tasks, etc.).

FIG. 1A shows an example system 100 for generating tasks using machine learning. The system 100 includes several computer systems 104a-104e communicatively coupled to one another through a network 106. Further, a task generation system 150 including a neural network 152 is maintained on at least one of the computer systems (e.g., the computer system 104a).

In an example of operation of the system 100, the computer system 104b monitors an electronic communication 164 between a customer 160 and a service representative 162 of an organization, and generates conversation data 108 representing at least a portion of the electronic communication.

In some implementations, the electronic communication 164 can include the exchange of audio content, video content, or a combination thereof. As an example, the electronic communication 164 can be a telephone call or video call established between an electronic device 166a of the customer 160 and an electronic device 166b of the service representative 162, where each of the electronic devices 166a and 166b is one or more of a telephone, cellular phone, smart phone, computer (e.g., notebook computer, desktop computer, server computer, etc.), tablet computer, or wearable device (e.g., smart watch). In some implementations, the electronic communication 164 can include the exchange of one or more streams or channels of data (e.g., one or more streams or channels of audio data, video data, or combinations thereof).

Further the electronic communication 164 can include the bi-directional exchange of content in real time or substantially real time. For example, during a communications session, the electronic device 166a can continuously generate audio content and/or video content representing the customer 160 (e.g., representing the customer's speech or other utterances, appearance, movements, etc.) and transmit the audio content and/or video content to the electronic device 166b. In turn, the electronic device 162b can present at least a portion of the content to the service representative 162. Further, during the same communications session, the electronic device 166b can continuously generate audio content and/or video content of the service representative 162 (e.g., representing the service representative's speech or other utterances, appearance, movements, etc.) and transmit the audio content and/or video content to the electronic device 166a. In turn, the electronic device 166a can present at least a portion of the content to the customer 160. The customer 160 and the service representative 162 can conduct a conversation in real time based this exchange of data.

In some implementations, the conversation data 108 can include audio and/or video of at least a portion of the conversation between the customer 160 and the service representative 162. For example, the conversation data 108 can include at least a portion of the audio content and/or the video content that is exchanged between the electronic device 166a and the electronic device 166b during the communications session between them.

In some implementations, the conversation data 108 can include a transcription of at least a portion of the conversation between the customer 160 and the service representative 162. For example, the conversation data 108 can include a textual representation of speech or other utterances made by the customer 160 and/or the service representative 162 during the conversation. In some implementations, the computer system 104b can generate a transcript by obtaining audio content of at least a portion of the conversation (e.g., an audio recording), and performing a speech recognition process (e.g., automatic speech recognition (ASR) process, computer speech recognition process, speech to text (STT) process, etc.) to generate a textual representation of the conversation.

While the electronic communication 164 between the customer 160 and the service representative 162 is ongoing, the computer system 104b provides at least a portion of the conversation data 108 to the computer system 104a and the task generation system 150. Using the neural network 152, the task generation system 150 automatically identifies one or more requests by the customer 160, and one or more tasks for the service representative 162 to perform to fulfill the request(s). The task generation system 150 generates data representing the identified request(s) and task(s), and provides the data to a computer system 104c for presentation to the service representative 162.

In general, the task generation system 150 can use one or more machine learning techniques to identify requests and corresponding tasks. For example, the task generation system 150 can obtain multiple sets of training data 110 (e.g., from a computer system 104*d*), each set of training data 110 corresponding to a respective previously conducted electronic communication between a customer and a service representative. For example, a set of training data 110 can include (i) conversation data representing a respective previously conducted electronic communication between a customer and a service representative (e.g., audio content, video content, transcript, etc.), (ii) data indicating the request(s) made by the customer during that electronic communication, and (iii) data indicating the task(s) that were performed by the service representative to fulfill the customer's requests (e.g., the identify the tasks, the order in which the tasks were performed, the interdependencies between the tasks, whether the tasks were performed during the electronic communication or after the electronic communication had concluded, etc.). Based on the training data 110, the task generation system 150 can train a neural network 152 to recognize characteristics in conversation data regarding a present electronic communication that are indicative of a particular request and/or task. Further, the task generation system 150 can train a neural network 152 to recognize a particular order in which the tasks are to be performed, any interdependencies between the tasks. Further, the task generation system 150 can train a neural network 152 to recognize whether certain tasks are to be performed during the electronic communication or after the electronic communication had concluded.

In some implementations, the training data 110 can include metrics regarding an outcome of the previously conducted electronic communications. For example, for each previously conducted electronic communication, the training data 110 can include a metric indicating a length of time of the electronic communication. As another example, for each previously conducted electronic communication, the training data 110 can include a metric indicating a satisfaction of the customer during the electronic communication (e.g., as determined by a sentiment analyzer). As another example, for each previously conducted electronic communication, the training data 110 can include a metric indicating a satisfaction of the customer upon completion of the electronic communication (e.g., as determined by a customer survey). As another example, for each previously conducted electronic communication, the training data 110 can include a metric indicating a satisfaction of the customer upon the service representative performing the tasks that had been identified by the task generation system 150 and/or the service representative (e.g., as determined by a customer survey). As another example, for each previously conducted electronic communication, the training data 110 can include a metric indicating an efficiency of the service representative in performing those tasks (e.g., the amount of time that the customer service representative spent to complete the tasks, the length of time from the beginning of the electronic communication to the completion of the final task, etc.).

Using these metrics, the task generation system 150 can train the neural network 152 to determine a set of tasks and an order for performing those tasks (including whether to perform certain tasks during the electronic communication or after the electronic communication has concluded) to effectively and efficiently fulfill the customer's request(s). For example, using these metrics, the task generation system can train the neural network 152 to favor sets of tasks and orders of tasks that result in (i) an electronic communication that is shorter in length, (ii) higher customer satisfaction during an electronic communication, (iii) higher customer satisfaction upon completion of the tasks by the service representative, and/or (iv) higher efficiency of the service representative in performing those tasks.

As described above, in some implementations, the task generation system 150 can generate a data structure (e.g., a node graph) representing the tasks, the categories of the tasks, the order for performing the tasks, interdependencies between the tasks, and whether the tasks should be performed during the communications session or after the communications session has concluded. Further, the task generation system 150 can present at least a portion of the data structure to the service representative.

Figure 1B:
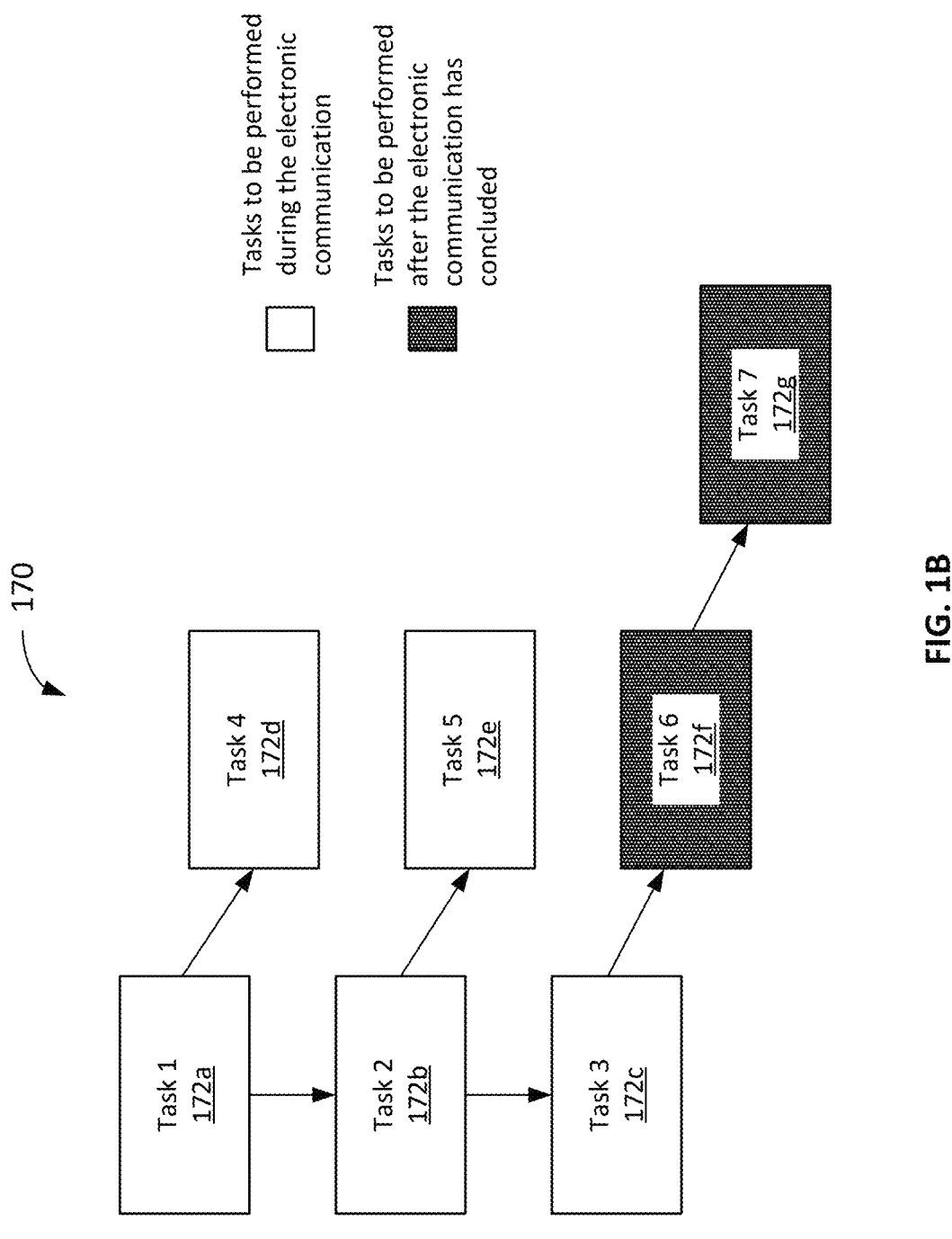
FIG. 1B is a diagram of an example node graph.

An example node graph 170 is shown in FIG. 1B. The node graph 170 includes several nodes 172*a*-170*h*, each representing a particular task to be performed by a service representative (e.g., as determined by the neural network 152). The spatial arrangement and/or sequence of the nodes on the node graph can indicate an order for performing the corresponding tasks (e.g., as also determined by the neural network 152). Further, interconnections between the nodes can indicate an interdependency between those nodes (e.g., as also determined by the neural network 152). Further, a visual appearance (e.g., shading, color, etc.) of the nodes can indicate whether the corresponding tasks should be performed during the communications session or after the communications session has concluded.

For example, the arrangement of the node graph 170 indicates that "Task 2" and "Task 4" are dependent on the completion of "Task 1," "Task 3" and "Task 5" are dependent on the completion of "Task 2," "Task 6" is dependent on the completion of "Task 3," and "Task 7" is dependent on the completion of "Task 6." Further, nodes that are positioned closer to a particular side of the node graph 170 (e.g., the top of the node graph 170) may be performed prior to nodes positioned farther from that side. For example, the arrangement of the node graph 170 can indicate that the tasks are to be performed in the following sequence: Task 1, Task 4, Task 2, Task 5, Task 3, Task 6, and Task 7. Further, the node graph 170 indicates that Tasks 1-5 should be performed during the electronic communication, whereas Tasks 6 and 7 should be performed after the electronic communication has concluded. The node graph 170 can generated, at least in part, based on a processing of data by the neural network 152.

In some implementations, the neural network 152 can receive data regarding the electronic communication 164 (e.g., the conversation data 108), and output a first set of metrics based on the data. Each metric from the first set can indicate that likelihood that the customer has made a particular request during the electronic communication 164. As an example, a metric having a high value can indicate that the customer is likely to have made a particular request during the electronic communication 164. Further, a metric having a low value can indicate that the customer is unlikely to have made a particular request during the electronic communication 164.

Further, the neural network 152 can receive data regarding the electronic communication 164 (e.g., the conversation data 108), and output a second set of metrics based on the data. Each metric from the second set can indicate that likelihood that a particular task would be performed by a service representative to fulfill the customer's request(s). As an example, a metric having a high value can indicate that a particular task would likely be performed by a service representative to fulfill the customer's request(s). Further, a metric having a low value can indicate that a particular task would unlikely be performed by a service representative to fulfill the customer's request(s).

In some implementations, the neural network 152 can be further trained based on external data 112 (e.g., from a computer system 104*e*). The external data 112 can include information regarding requests and/or tasks that is not obtained directly from a conversation between a customer and a service representative.

An example, the external data 112 can include a listing of candidate requests that may be made by the customer 160. For instance, the external data can include a list of services of an organization that are available to its customers.

Another example, the external data 112 can include information regarding candidate sequences of tasks that can be performed by a service representative to fulfill certain requests. For instance, the external data can include sequences of tasks that were manually generated by users (e.g., service representatives, administrators, etc.) to fulfill certain tasks.

The external data 112 can be used as further inputs to train the neural network 152. For example, the external data 112 can be used to identify an exclusive or non-exclusive set of requests that may be made by a customer in an electronic communication. As another example, the external data 112 can be used to identify an exclusive or non-exclusive set of sequences of tasks that could be performed to fulfill those requests.

In some implementations, the neural network 152 can be further trained based on input provided by service representatives, either during an electronic communication with a customer or subsequent to the conclusion of the electronic communication.

As an example, the task generation system 150 can generate a data structure (e.g., a node graph) representing tasks for a service representative to perform, and cause at least a portion of the data structure to the presented to the service representative. The service representative can manually modify one or more aspects of the data structure. For example, the service representative can modify the data structure to add one or more additional tasks (e.g., by adding one or more additional nodes to the node graph). As another example, the service representative can modify the data structure to remove one or more tasks (e.g., by removing one or more nodes from the node graph). As another example, the service representative can modify the data structure to change to order in which the tasks are performed (e.g., by changing the arrangement of the nodes in the node graph). As another example, the service representative can modify interdependencies between the tasks (e.g., by changing the interconnections between the nodes in the node graph). As another example, the service representative can modify a category of the tasks (e.g., by changing a task such that it would be performed during the electronic communication rather than after the conclusion of the electronic communication, or vice versa).

These modifications can be provided to the task generation system 150 to further train the neural network 152 (e.g., to provide feedback to the neural network 152 regarding a preferred and/or "ground truth" set of tasks, order of tasks, interdependencies of tasks for a particular electronic communication, categories of the tasks, etc.).

Example techniques for training a neural network are described in further detail below.

In some implementations, the task generation system 150 can also identify content from the electronic communication 164 that is relevant to the completion of one or more tasks, and store that content for future retrieval.

As an example, a task may include the service representative 162 asking the customer 160 a question, and using the customer's answer to complete a form. The task generation system 150 can monitor the electronic communication 164, and detect that the customer has provided an answer (e.g., in the form of a spoken response, gesture, etc.). The task generation system 150 can store the customer's answer (e.g., using a computerized storage medium) such that the service representative 162 can later access the information. This can be beneficial, for example, in reducing the likelihood that a service presentative misses important information during the electronic communication 164. Further, this can reduce the length of the electronic communication 164, which can improve customer satisfaction and/or reduce the expenditure of resources by the system 100. Further still, this can enable the service representative 162 to concentrate on interacting with the customer 160, rather than manually taking notes regarding their conversation (which may distract the service represented 162 and reduce customer satisfaction).

Referring back to FIG. 1A, each of the computer systems 104*a*-104*e* can include any number of electronic device that are configured to receive, process, and transmit data. Examples of the computer systems 104*a*-104*e* include client computing devices (e.g., desktop computers or notebook computers), server computing devices (e.g., server computers or cloud computing systems), mobile computing devices (e.g., cellular phones, smartphones, tablets, personal data assistants, notebook computers with networking capability), wearable computing devices (e.g., smart phones or headsets), and other computing devices capable of receiving, processing, and transmitting data. In some implementations, the computer systems 104*a*-104*e* can include computing devices that operate using one or more operating systems (e.g., Microsoft Windows, Apple macOS, Linux, Unix, Google Android, and Apple iOS, among others) and one or more architectures (e.g., x86, PowerPC, and ARM, among others). In some implementations, one or more of the computer system 104*a*-104*c* need not be located locally with respect to the rest of the system 100, and one or more of the computer systems 104*a*-104*c* can be located in one or more remote physical locations.

Each the computer systems 104*a*-104*e* can include a respective user interface that enables users interact with the computer system 104*a*-104*e* and the task generation system 150, such as to view data from one or more of the computer systems 104*a*-104*c* or the task generation system 150, transmit data from one computer system 104*a*-104*c* to another, or to issue commands to one or more of the computer systems 104*a*-104*e* or the task generation system 150. Commands can include, for example, any user instruction to one or more of the computer system 104*a*-104*e* or the task generation system 150 to perform particular operations or tasks. In some implementations, a user can install a software application onto one or more of the computer systems 104*a*-104*e* to facilitate performance of these tasks.

In FIG. 1A, the computer systems 104*a*-104*e* are illustrated as respective single components. However, in practice, the computer systems 104*a*-104*e* can be implemented on one or more computing devices (e.g., each computing device including at least one processor such as a microprocessor or microcontroller). As an example, the computer system 104*a* can be a single computing device that is connected to the network 106, and the task generation system 150 can be maintained and operated on the single computing device. As another example, the computer system 104*a* can include multiple computing devices that are connected to the network 106, and the task generation system 150 can be maintained and operated on some or all of the computing devices. For instance, the computer system 104*a* can include several computing devices, and the task generation system 150 can be distributed on one or more of these computing devices.

The network 106 can be any communications network through which data can be transferred and shared. For example, the network 106 can be a local area network (LAN) or a wide-area network (WAN), such as the Internet. The network 106 can be implemented using various networking interfaces, for instance wireless networking interfaces (such as Wi-Fi, Bluetooth, or infrared) or wired networking interfaces (such as Ethernet or serial connection). The network 106 also can include combinations of more than one network, and can be implemented using one or more networking interfaces.

Figure 2:
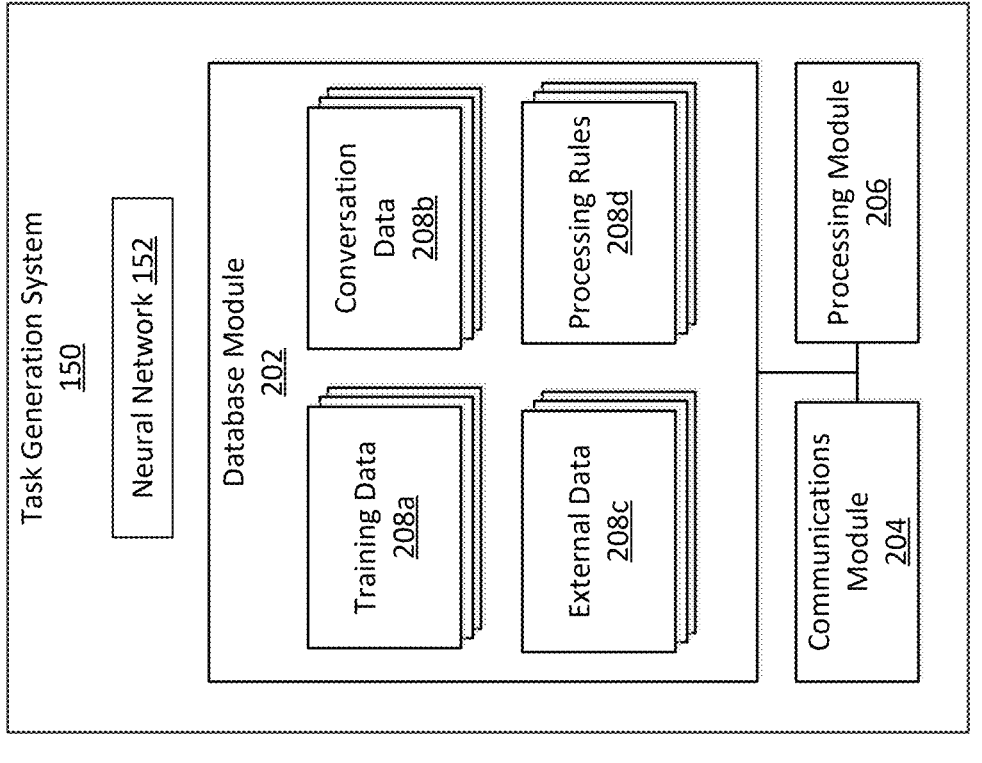
FIG. 2 is a diagram of an example task generation system.

FIG. 2 shows various aspects of the task generation system 150. The task generation system 150 includes a neural network 152 and several operation modules that perform particular functions related to the operation of the task generation system 150. For example, the task generation system 150 can include a database module 202, a communications module 204, and a processing module 206. The operation modules can be provided as one or more computer executable software modules, hardware modules, or a combination thereof. For example, one or more of the operation modules can be implemented as blocks of software code with instructions that cause one or more processors of the task generation system 150 to execute operations described herein. In addition or alternatively, one or more of the operations modules can be implemented in electronic circuitry such as, e.g., programmable logic circuits, field programmable logic arrays (FPGA), or application specific integrated circuits (ASIC).

The database module 202 maintains information related to generating tasks and corresponding data structures (e.g., node graphs) using the neural network 152. As an example, the database module 202 can store training data 208a that is used to train the neural network 152 to generate tasks and corresponding data structures. The training data 208a can include historical information regarding one or more previously conducted electronic communications between one or more customers and one or more service representatives, and the request(s) and task(s) associated with those electronic communications. Further, the training data 208a can include feedback from one or more service representatives (e.g., information regarding manually modifications to one or more aspects of a data structure). In some implementations, the training data 208a can be similar to the training data 110 described with reference to FIG. 1.

Further, the database module 202 can store conversation data 208b and external data 208c for use in generating tasks and associated data structures in one or more presently conducted electronic communications. As an example, the conversation data 208b and the external data 208c can include the conversation data 108 and/or the external data 112, respectively, described with reference to FIG. 1.

Further, the database module 202 can store processing rules 208d specifying how data in the database module 202 can be processed to train a neural network 152 to generate tasks and corresponding data structures. For instance, the processing rules 208d can specify how the training data 208a is used by the task generation system 150 to train a neural network 152 to identify requests made by a customer during an electronic communication, and corresponding tasks that can be performed to fulfill those requests. Further, the processing rules 208d can specify how the training data 208a is used by the task generation system 150 to train a neural network 152 to identify the order in which the tasks should be performed, the independencies between the tasks, and/or and whether particular tasks should be performed during the electronic communication or after the electronic communication has concluded.

For example, the processing rules 208d can specify one more machine learning or artificial intelligence processes for identifying patterns, trends, or correlations in the input data that indicate that a customer has made a particular type of request during an electronic communication.

As another example, the processing rules 208d can specify one more machine learning or artificial intelligence processes for identifying patterns, trends, or correlations in the input data that indicate that a particular task would be performed by a service representative to successfully fulfill the customer's request.

As another example, the processing rules 208d can specify one more machine learning or artificial intelligence processes for identifying patterns, trends, or correlations in the input data that indicate a particular order for performing the tasks to fulfill the customer's request.

As another example, the processing rules 208d can specify one more machine learning or artificial intelligence processes for identifying patterns, trends, or correlations in the input data that indicate interdependencies between the tasks.

As another example, the processing rules 208d can specify one more machine learning or artificial intelligence processes for identifying patterns, trends, or correlations in the input data that indicate whether certain tasks should be performed during the electronic communication or after the electronic communication has concluded.

As another example, the processing rules 208d can specify that at least a portion of the training data 208a be used as input data in the machine learning or artificial intelligence processes (e.g., to provide "ground truth" examples that can aid in the identification of patterns or trends). Accordingly, the task generation system 150 can be trained to generate tasks and corresponding data structures in newly conducted electronic communications based on information regarding previously conducted electronic communications. In some implementations, the processing rules 208d can specify that the neural network 152 be iteratively trained and re-trained with successive sets of training data 208a (e.g., additional sets of training data 208a that are collected over time) to progressively improve its accuracy in generating tasks and corresponding data structures. In some implementations, the processing rules 208d can specify that a training process be performed automatically by the task generation system 150 without manual user input.

As another example, the processing rules 208d can specify that the neural network 152 generate tasks and corresponding data structures in accordance with particular criteria. For example, the processing rules 208d can specify that the neural network 152 to favor sets of tasks and orders of tasks that result in (i) an electronic communication that is shorter in length, (ii) higher customer satisfaction during an electronic communication, (iii) higher customer satisfaction upon completion of the tasks by the service representative, and/or (iv) higher efficiency of the service representative in performing those tasks.

Example machine learning or artificial intelligence process are described in further detail below.

As described above, the task generation system 150 also includes a communications module 204. The communications module 204 allows for the transmission of data to and from the task generation system 150. For example, the communications module 204 can be communicatively connected to the network 106, such that it can transmit data to and receive data from each of the computer systems 104*b*-104*e*. Information received from the computer systems 104*b*-104*e* can be processed (e.g., using the processing module 206) and stored (e.g., using the database module 202).

Further, the communications module 204 can generate a notification to one or more users regarding the generated tasks and corresponding data structures. As an example, the communications module can generate one or more e-mails, chat messages, text messages (e.g., Short Message Service messages), voice messages, video messages, audio messages, and/or any other notification, and transmit that notification to the computer system 104*c* of the service representative 162 (e.g., via the communications network 106). Example communications devices include network-enabled client computing devices, server computing devices, mobile computing devices, wearable computing devices, telephones, pagers, beepers, or any other computing device capable of receiving and/or transmitting data.

As another example, the communications module can cause the computer system 104*c* to present a user interface including information regarding the request(s) made by the customer 160 and any associated tasks. For example, the user interface can identify tasks for performance by the service representative, the order in which the tasks are to be performed, and whether the service representative should perform the tasks during the communications session or after the communications session has concluded As described above, the task generation system 150 also includes a processing module 206. The processing module 206 processes data stored or otherwise accessible to the task generation system 150. For instance, the processing module 206 can generate and train the neural network 152 to generate tasks and associated data structures, given particular training data 208*a*, external data 208*c*, and processing rules 208*d*.

Further, the processing module 206 can modify the neural network 152 based the training data 208*a*, the external data 208*c*, and the processing rules 208*d*. For example, as described above, the processing module 206 can perform one or more machine learning or artificial intelligence processes to identify patterns, trends, or correlations in input data that indicate whether particular tasks should be performed to fulfill a customer's requests, and additional information regarding those tasks (e.g., the order of the tasks, independencies between the tasks, categories of the tasks, etc.). The identified patterns, trends, or correlations can be used to generate or modify one or more of the processing rules 208*d* for generating and updating the neural network 152 (e.g., to distinguish between different sets of input data and corresponding tasks). Further, as described above, at least a portion of the training data 208*a* can be used as input data in the machine learning or artificial intelligence processes. Further, as described above, the processing module 206 can perform the training processes iteratively using successive sets of training data 208*a* to progressively improve the neural network's accuracy in generating tasks. In some implementations, this training process can be performed automatically by the processing module 206 without manual user input.

In some implementations, a software application can be used to facilitate performance of the tasks described herein. As an example, an application can be installed one or more of the computer systems 104*a*-104*c*. Further, a user can interact with the application to input data and/or commands to the task generation system 150, and review data generated by the task generation system 150.

Figure 3:
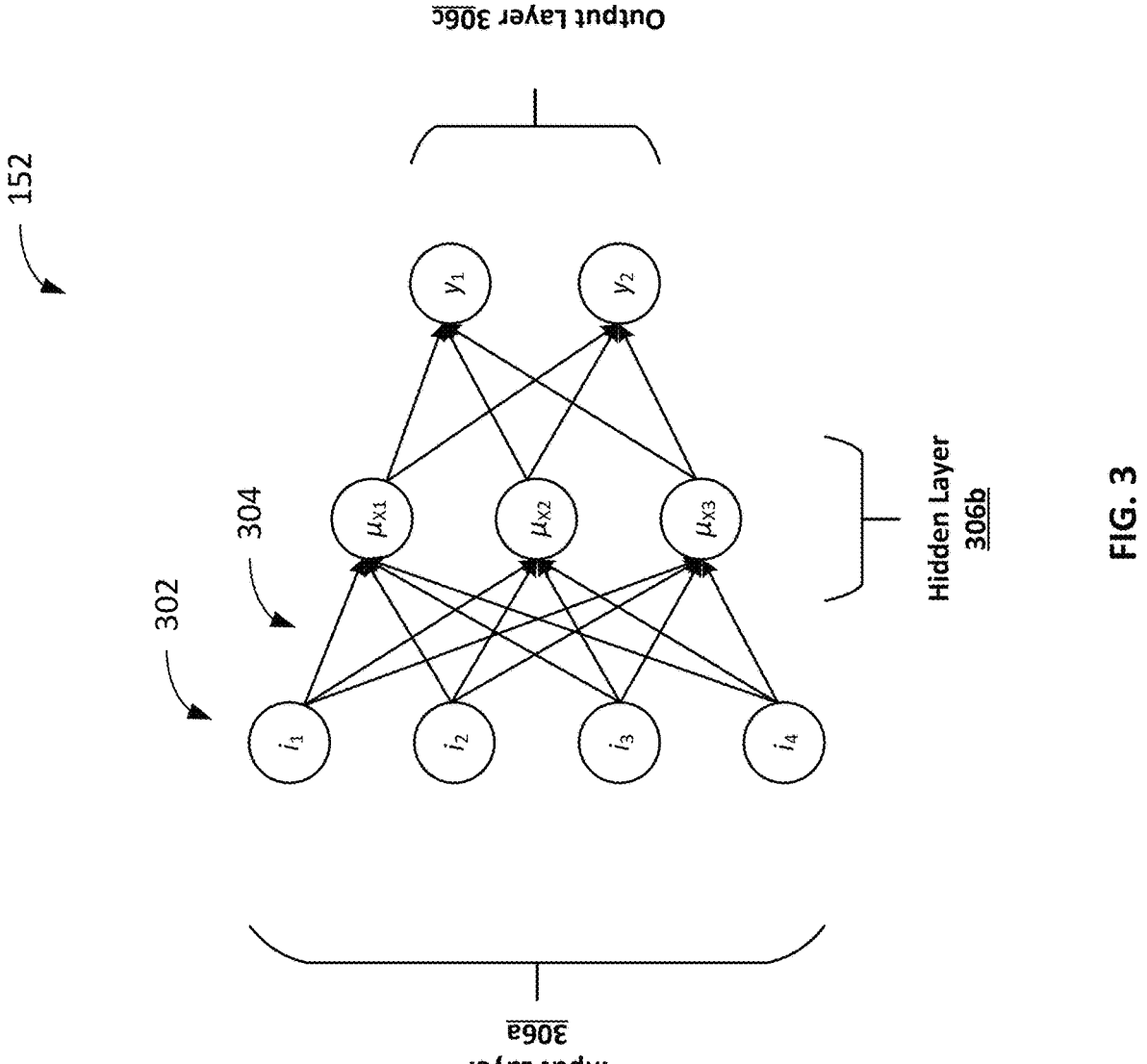
FIG. 3 is a diagram of an example neural network.

As described above, a machine learning process can be performed using one or more neural networks 152. A simplified example of a neural network 152 is shown in FIG. 3.

The neural network 152 includes several nodes 302 (often called "neurons") interconnected with another by interconnections 304. Further, the nodes 302 are arranged according to multiple layers, including an input layer 306*a*, a hidden layer 306*b*, and an output layer 306*c*. The arrangement of the nodes 302 and the interconnections 304 between them represent a mathematical transformation of input data (e.g., as received by the nodes of the input layer 306*a*) into corresponding output data (e.g., as output by the nodes of the output layer 306*c*). In some implementations, the input data can represent one or more data points obtained by the task generation system 150, and the output data can represent one or more corresponding predictions generated by the task generation system 150 based on the input data.

The nodes 302 of the input layer 306*a* receive input values and output the received input values to respective nodes of the next layer of the neural network 152. In this example, the neural network 152 includes several inputs $i_1$, $i_2$, $i_3$, and $i_4$, each of which receives a respective input value and outputs the received value to one or more of the nodes $\mu_{x1}$, $\mu_{x2}$, and $\mu_{x3}$ (e.g., as indicated by the interconnections 304).

In some implementations, at least some of the information stored by the database module (e.g., the conversation data 208*b* and external data 208*c*) can be used as inputs for the nodes of the input layer 306*a*. For example, at least some of the information stored by the database module can be expressed numerically (e.g., assigned a numerical score or value), and input into the nodes of the input layer 306*a*.

The nodes of the hidden layer 306*b* receive input values (e.g., from the nodes of the input layer 306*a* or nodes of other hidden layers), applies particular transformations to the received values, and outputs the transformed values to respective nodes of the next layer of the neural network 152 (e.g., as indicated by the interconnections 304). In this example, the neural network 152 includes several nodes $\mu_{x1}$, $\mu_{x2}$, and $\mu_{x3}$, each of which receives respective input values from the nodes $i_1$, $i_2$, $i_3$, and $i_4$, applies a respective transformation to the received values, and outputs the transformed values to one or more of the nodes $y_1$ and $y_2$.

In some implementations, nodes of the hidden layer 306*b* can receive one or more input values, and transform the one or more received values according to a mathematical transfer function. As an example, the values that are received by a node can be used as input values in particular transfer function, and the value that is output by the transfer function can be used as the output of the node. In some implementations, a transfer function can be a non-linear function. In some implementations, a transfer function can be a linear function.

In some implementations, a transfer function can weight certain inputs differently than others, such that certain inputs have a greater influence on the output of the node than others. For example, in some implementations, a transfer function can weight each of the inputs by multiplying each of the inputs by a respective coefficient. Further, in some implementations, a transfer function can apply a bias to its output. For example, in some implementations, a transfer function can bias its output by a particular offset value.

For instance, a transfer function of a particular node can be represented as:

$$Y = \sum_{i=1}^{n} (\text{weight}_i * \text{input}_i) + \text{bias},$$

where $\text{weight}_i$ is the weight that is applied to an input $\text{input}_i$, bias is a bias or offset value is that is applied to the sum of the weighted inputs, and Y is the output of the node.

The nodes of the output layer 306c receive input values (e.g., from the nodes of the hidden layer 306b) and output the received values. In some implementations, nodes of the output layer 306c can also receive one or more input values, and transform the one or more received values according to a mathematical transfer function (e.g., in a similar manner as the nodes of the hidden layer 306b). As an example, the values that are received by a node can be used as input values in particular transfer function, and the value that is output by the transfer function can be used as the output of the node. In some implementations, a transfer function can be a non-linear function. In some implementations, a transfer function can be a linear function.

In some implementations, at least one of the nodes of the output layer 306c can correspond to a metric that indicates the likelihood that the customer has made a particular request during an electronic communication. As an example, a metric having a high value can indicate that the customer is likely to have made a particular request during the electronic communication. Further, a metric having a low value can indicate that the customer is unlikely to have made a particular request during the electronic communication.

In some implementations, at least one of the nodes of the output layer 306c can correspond to a metric that indicates the likelihood that particular task would be performed by a service representative to fulfill the customer's request(s). As an example, a metric having a high value can indicate that a particular task would likely be performed by a service representative to fulfill the customer's request(s). Further, a metric having a low value can indicate that a particular task would unlikely be performed by a service representative to fulfill the customer's request(s).

In some implementations, at least one of the nodes of the output layer 306c can correspond to a metric that indicates the likelihood that particular task should be performed during an electronic communication (or conversely, the likelihood that particular task should be performed after the conclusion of the electronic communication). As an example, a metric having a high value can indicate that a particular task should likely be performed during an electronic communication. Further, a metric having a low value can indicate that a particular task should likely be performed after the conclusion of the electronic communication.

Further, at least some of the nodes of the output layer 306c can correspond to an order for performing certain tasks, whether interdependencies exist between two or more of the tasks.

In this example, the neural network 152 includes two output nodes $y_1$ and $y_2$, each of which receives respective input values from the nodes $\mu_{x1}$, $\mu_{x2}$, and $\mu_{x3}$, applies a respective transformation to the received values, and outputs the transformed values as outputs of the neural network 152.

Although FIG. 3 shows example nodes and example interconnections between them, this is merely an illustrative example. In practice, a neural network can include any number of nodes that are interconnected according to any arrangement. Further, although FIG. 3 shows a neural network 152 having a single hidden layer 306b, in practice, a network can include any number of hidden layers (e.g., one, two, three, four, or more), or none at all.

Figure 4:
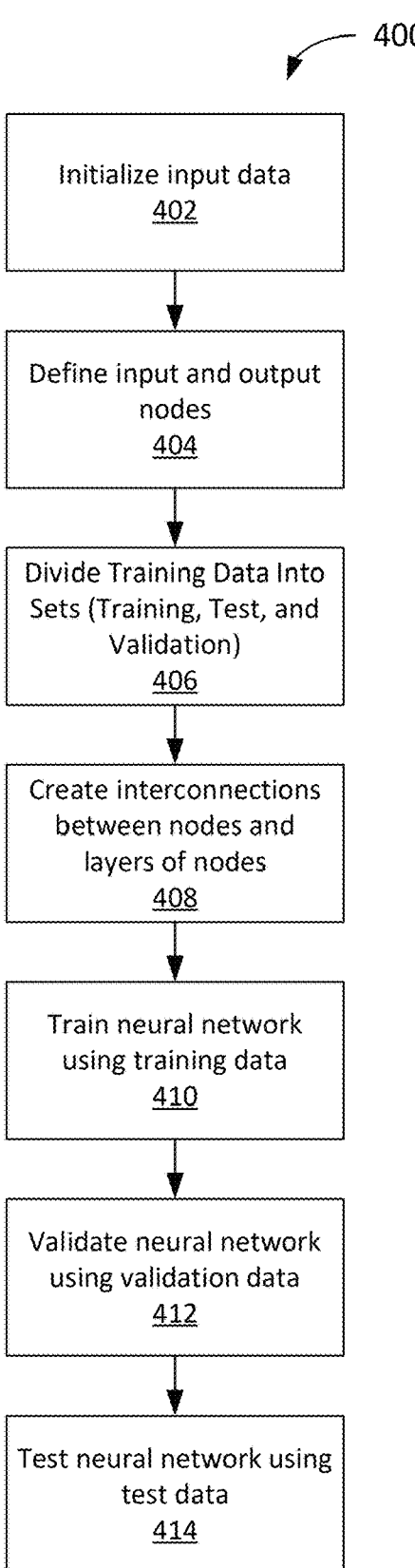
FIG. 4 is a flow chart diagram of an example process for training a neural network.

In some implementations, the neural network 152 can be trained based on training data, such as the training data 208a stored in the database module 202. An example process 400 for training the neural network 152 is shown in FIG. 4.

According to the process 400, the task generation system 150 initializes the input data that is used to train the neural network 152 (block 402). As an example, the task generation system 150 can retrieve at least a portion of the training data 208a, as described above.

Further, the task generation system 150 defines the input and the output nodes of the neural network 152 (block 404). For example, the task generation system 150 can select one or more of the types of data include in the training data 208a (for example, as described above), and specify that they be used as respective input nodes in the neural network 152 (e.g., as inputs for respective nodes of the input layer 306a). As another example, the task generation system 150 can specify each of the outputs of the neural network (e.g., the outputs of each of the nodes of the output layer 306c).

The task generation system 150 divides the training data 208a into different sets (block 406). For example, the training data 208a can be divided into a training set, a validation set, and a test set.

The training set can be used to train the neural network 152. For example, the training set can be used to identify patterns, trends, or correlations between the inputs and the outputs of the neural network 152, and to express those relationships using the nodes and interconnections between them.

The validation set can be used to tune the performance of the trained neural network 152. For example, the validation set can be used to determine a difference between the output of the neural network 152 given certain inputs, and an expected output. The configuration of the neural network can be modified based on the different (e.g., such that the output of the neural network 152 better matches the expected result).

The test set can be used to evaluate the performance of the trained neural network 152 (e.g., after it has been tuned based on the validation set). For example, the test set can be used to determine a difference between the output of the neural network 152 given certain inputs, and an expected output. This difference can indicate the ability of the neural network 152 to accurately predict a particular outcome (e.g., identify a request and corresponding tasks, an order for performing the tasks, interdependencies between the tasks, categories for the tasks, etc.) given particular inputs (e.g., particular conversation data and/or external data).

Further, the task generation system 150 creates interconnections between the nodes and layers of nodes in of the neural network 152 (block 408). In some implementations, an interconnection between two or more nodes can be in the forward direction (e.g., data can be passed between nodes in the direction of the input to the output of the neural network 152). This may be referred to as a "feed forward" interconnection. In some implementations, an interconnection between two or more nodes can be in the backward direction (e.g., data can be passed between nodes in the direction of the output to the input of the neural network 152). This may be referred to as a "back propagation" interconnection.

Further, the task generation system 150 creates layers of nodes. For example, the task generation system 150 can specify that the neural network include N layers of nodes, such as one input layer, one output layer, and N−2 hidden layers. Other arrangements of layers are also possible, depending on the implementation.

Further, the task generation system 150 trains the neural network 152 using the training set (block 410). In some implementations, the task generation system 150 can perform the training based on a supervised learning method. As an example, the training set can include example input data and output data. Based on the arrangement of the nodes and the interconnections between them, the task generation system 150 can identify transfer functions for each of the nodes that would result in the output of the neural network 152 matching or otherwise being similar to the output data in the training set, given the same input data. In some implementations, the task generation system 150 can select particular weights or biases for each of the transfer functions. In some implementations, this can be performed iteratively (for example, using successive sets of training data).

After training the neural network 152, the task generation system 150 validates the neural network 152 using the validation set (block 412). As an example, the validation set can include example input data and output data. The task generation system 150 can input the input data into the neural network 152, and compare the output of the neural network 152 to the output data of the validation set. In some implementations, the task generation system 150 can calculate an "error" of the neural network 152, such as the difference between the output data of the validation set and the output of the neural network 152.

In some implementations, the task generation system 150 can tune the neural network 152 based on the validation set. For example, the task generation system 150 can modify the arrangement of the nodes, the interconnections between them, and/or the transfer functions (e.g., the weights and biases) such that the error of the neural network 152 is reduced.

In some implementations, this can be performed iteratively (e.g., using successive sets of validation data) until particular criteria are met. For example, in some implementations, the task generation system 150 can iteratively tune the neural network 152 until the error of the neural network 152 is less than a particular threshold value.

After training and tuning the neural network 152, the task generation system 150 tests the neural network 152 using the test set (block 414). As an example, the test set can include example input data and output data. The task generation system 150 can input the input data into the neural network 152, and compare the output of the neural network 152 to the output data of the test set. In some implementations, the task generation system 150 can calculate an "error" of the neural network 152, such as the difference between the output data of the test set and the output of the neural network 152. This error can represent the predictive performance of the neural network 152. For example, a high error can indicate that the neural network 152 is not likely to predict an outcome accurately, given certain input data. Conversely, lower error can indicate that the neural network 152 is likely to predict an outcome accurately, given certain input data.

Further, although example neural networks are provided, other types of machine learning system can be used to implement some or all of the techniques described herein, either instead of our in addition to neural networks. Example machine learning systems include decision tree systems, support-vector machines, regression analysis systems, Bayesian networks, and genetic algorithms, among others.

In general, the implementations described in this disclosure can provide various technical benefits. For instance, the machine learning processes described herein enable a computer system to automatically identify tasks for performance by a service representative to fulfill a customer's request, and to identify an order for performing those tasks such that the request is fulfilled in an effective and efficient manner. Further, the computer system can automatically perform these tasks without manual human intervention, and using objective sets of rules or criteria that are particularly suitable for execution by a computer (e.g., rather than subjective sets of rules or criteria that might be considered by a human).

For example, machine learning processes described herein enable a computer system to generate an ordered list of task to fulfill a customer's request, even if a human user had not previously encountered such a request and/or had not developed a plan to deal with such a request. This enables a computer system to find emergent solutions to problems without manual human input.

As an example, an organization can offer insurance products to its customers, and allow customers to make claims with a service representative through electronic communications (e.g., phone call, video call, etc.). Using the machine learning processes described herein, a computer system to automatically determine an order lists of tasks for processing the claim, even if the claim pertains to circumstances that have not been previously encountered by a service representative (e.g., an unusual type of natural disaster, an unusual type of damage to property, etc.).

Further, the implementations described herein can reduce the amount of time that the customer and service representative are conversing with each other (e.g., compared to systems that do not include the features described herein), without negatively impacting the effectiveness of the service representative in fulfilling the customer's requests. Accordingly, the user experience of the customer is improved.

Further still, the implementations described herein can reduce the amount of resources consumed by a communications system of an organization. For example, to facilitate electronic communications between customers and service representatives, an organization expends certain computational resources, network resources, and power resources to establish and maintain each communications session. Further, communications sessions that are longer in length may consume a larger amount of computational resources, network resources, and/or power resources, compared to communications sessions that are shorter in length. Accordingly, in reducing the length of communications sessions (e.g., using the machine learning systems and processes described herein), an organization can reduce the resources consume by its communications systems, thereby improving the efficiency of its operation.

Example Processes

FIG. 5 shows an example process 500 for example process for generating tasks using machine learning. In some implementations, the process 500 can be performed by the system 100 described in this disclosure (for example, the system 100 including the task generation system 150 shown and described with reference to FIGS. 1 and 2) using one or more processors (for example, using the processor or processors 610 shown in FIG. 6).

In the process 500, a computer system receives, during an electronic communication between a customer and a service representative, data representing the electronic communication (502).

In some implementations, the data representing the electronic communication can include an audio recording of at least a portion of the electronic communication and/or a transcript of at least the portion of the electronic communication.

In some implementations, the electronic communication can be a voice call and/or a video call.

The computer system provides the data to a machine learning system that is configured to generate a node graph based on the data (504). The node graph includes a plurality of nodes, including (i) a first node type representing one or more first tasks to be performed by the service representative while the electronic communication is occurring, and (ii) a second node type representing one or more second tasks to be performed by the service representative subsequent to the electronic communication. Further, interconnections between individual nodes among the plurality of nodes represent one or more dependencies between the respective interconnected nodes.

In some implementations, the node graph can include a plurality of first nodes including the first node type. Further, the node graph can include a plurality of second nodes including the second node type.

In some implementations, the machine learning system can be trained based on a plurality of sets of training data. As an example, a first set of training data from among the sets of training data can include (i) additional data representing an additional electronic communication between an additional customer and an additional service representative, and (ii) an additional node graph including a plurality of additional interconnected nodes, where each of the additional nodes represents a respective additional task performed by the additional service representative. Further, an interconnection of the plurality of additional nodes can represent one or more dependencies between the plurality of additional nodes.

In some implementations, the first set of training data can further include a metric representing an efficiency of the additional service representative in performing the additional tasks.

In some implementations, the first set of training data can further include a metric representing a satisfaction of the additional customer upon the additional service representative performing the additional tasks.

In some implementations, the first set of training data can further include a metric representing a length of time of the additional electronic communication.

In some implementations, the first set of training data can further include a metric representing a satisfaction of the additional customer during the additional electronic communication.

In some implementations, the first set of training data can further include a metric representing a satisfaction of the additional customer upon completion of the electronic communication.

While the electronic communication is occurring, the computer system causes at least a portion of the node graph to be presented to the service representative (506).

In some implementations, the method process 500 can also include receiving input from the service representative representing one or more modifications to the node graph, and training the machine learning system based on the input.

In some implementations, the one or more modifications can include an addition of a node to the node graph, a deletion of a node of the node graph, and/or a rearrangement of the node graph.

In some implementations, the one or more modifications can include a re-labeling of one of the nodes of the first node type as the second node type.

In some implementations, the one or more modifications can include a re-labeling of one of the nodes of the second node type as the first node type.

In some implementations, the process 500 can also include generating, based on the data and the node graph, one or more questions directed to the customer regarding the one or more first tasks, and causing at least some of the one or more questions to be presented to the service representative.

In some implementations, the process 500 can also include determining, based on the data, that the customer has provided an answer to the one or more questions during the electronic communication, storing the answer, and modifying the node graph based on the answer.

In some implementations, modifying the node graph can include indicating a completion of a task associated with a node of the node graph, deleting a node of the node graph, adding a node to the node graph, and/or rearranging the node graph.

In some implementations, the electronic communication can pertain to an insurance claim. Further, the one or more first tasks and the one or more second tasks can be respective tasks in processing the insurance claim by the service representative.

In some implementations, the machine learning system can include a neural network. Further, the neural network can include a plurality of neurons and a plurality of interconnections between the plurality of neurons. Each of the neurons can represent a respective numerical value. Each of the interconnections between the plural of neurons can represent a respective dependency between respective numerical values of respective interconnected neurons.

Example Systems

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the system 100 and the task generation system 150 can be implemented using digital electronic circuitry, or in computer software, firmware, or hardware, or in combinations of one or more of them. In another example, the process 500 shown in FIG. 5 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, that is, one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (for example, multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer can also include, or be operatively coupled to receive data from or transfer data to, or both, one or more mass storage devices for storing data, for example, magnetic, magneto optical disks, or optical disks. However, a computer need not have such devices. Devices suitable for storing computer program instructions and data include all forms of non-volatile memory, media and memory devices, including by way of example semiconductor memory devices (for example, EPROM, EEPROM, AND flash memory devices), magnetic disks (for example, internal hard disks, and removable disks), magneto optical disks, and CD-ROM and DVD-ROM disks. The processor and the memory can be supplemented by, or incorporated in, special purpose logic circuitry.

To provide for interaction with a user, operations can be implemented on a computer having a display device (for example, a monitor, or another type of display device) for displaying information to the user. The computer can also include a keyboard and a pointing device (for example, a mouse, a trackball, a tablet, a touch sensitive screen, or another type of pointing device) by which the user can provide input to the computer. Other kinds of devices can be used to provide for interaction with a user as well. For example, feedback provided to the user can be any form of sensory feedback, such as visual feedback, auditory feedback, or tactile feedback. Input from the user can be received in any form, including acoustic, speech, or tactile input. In addition, a computer can interact with a user by sending documents to and receiving documents from a device that is used by the user. For example, a computer can send webpages to a web browser on a user's client device in response to requests received from the web browser.

A computer system can include a single computing device, or multiple computers that operate in proximity or generally remote from each other and typically interact through a communication network. Examples of communication networks include a local area network ("LAN") and a wide area network ("WAN"), an inter-network (for example, the Internet), a network including a satellite link, and peer-to-peer networks (for example, ad hoc peer-to-peer networks). A relationship of client and server can arise by virtue of computer programs running on the respective computers and having a client-server relationship to each other.

Figure 6:
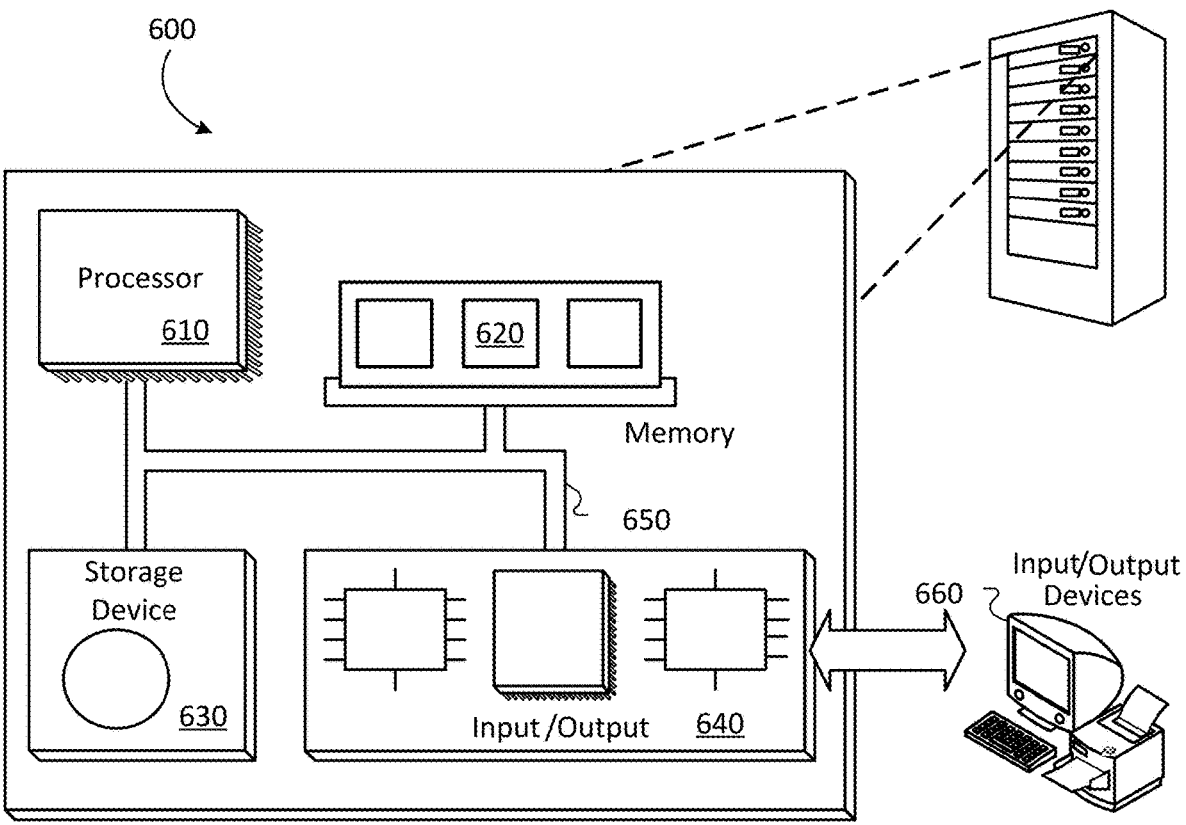
FIG. 6 is a schematic diagram of an example computer system.

FIG. 6 shows an example computer system 600 that includes a processor 610, a memory 620, a storage device 630 and an input/output device 640. Each of the components 610, 620, 630 and 640 can be interconnected, for example, by a system bus 650. The processor 610 is capable of processing instructions for execution within the system 600. In some implementations, the processor 610 is a single-threaded processor, a multi-threaded processor, or another type of processor. The processor 610 is capable of processing instructions stored in the memory 620 or on the storage device 630. The memory 620 and the storage device 630 can store information within the system 600.

The input/output device 640 provides input/output operations for the system 600. In some implementations, the input/output device 640 can include one or more of a network interface device, for example, an Ethernet card, a serial communication device, for example, an RS-232 port, or a wireless interface device, for example, an 802.11 card, a 3G wireless modem, a 4G wireless modem, or a 5G wireless modem, or both. In some implementations, the input/output device can include driver devices configured to receive input data and send output data to other input/output devices, for example, keyboard, printer and display devices 660. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, various modifications can be made without departing from the spirit and scope of the invention. Accordingly, other embodiments are within the scope of the claims.

What is claimed is:

1. A method comprising:

receiving, by a computer system and during an electronic communication between a customer and a service representative, data representing the electronic communication;

providing, by the computer system, the data to a machine learning system that is configured to generate a node graph based on the data, wherein the node graph comprises a plurality of nodes, including:

a first node type representing one or more first tasks to be performed by the service representative while the electronic communication is occurring, and a second node type representing one or more second tasks to be performed by the service representative subsequent to the electronic communication, and wherein interconnections between individual nodes among the plurality of nodes represent one or more dependencies between the respective interconnected nodes;

causing, by the computer system and while the electronic communication is occurring, at least a portion of the node graph to be presented to the service representative on a display of a computing device;

generating, by the computer system and based on the data and the node graph, one or more questions directed to the customer regarding the one or more first tasks;

causing, by the computer system, at least some of the one or more questions to be presented to the service representative on the display of the computing device;

determining, by the computer system and based on the data, that the customer has provided an answer to the one or more questions during the electronic communication;

storing the answer in a memory of the computing system, and;

modifying, by the computer system, the node graph based on the answer, wherein modifying the node graph comprises at least one of: indicating a completion of a task associated with a node of the node graph, deleting a node of the node graph, adding a node to the node graph, or rearranging the node graph.

2. The method of claim 1, wherein the data representing the electronic communication comprises at least one of:

an audio recording of at least a portion of the electronic communication, or a transcript of at least the portion of the electronic communication.

3. The method of claim 1, wherein the electronic communication is at least one of:

a voice call, or a video call.

4. The method of claim 1, wherein the node graph comprises a plurality of first nodes comprising the first node type.

5. The method of claim 1, wherein the node graph comprises a plurality of second nodes comprising the second node type.

6. The method of claim 1, wherein the machine learning system is trained based on a plurality of sets of training data, wherein a first set of training data from among the sets of training data comprises:

additional data representing an additional electronic communication between an additional customer and an additional service representative, and an additional node graph comprising a plurality of additional interconnected nodes, wherein each of the additional nodes represents a respective additional task performed by the additional service representative.

7. The method of claim 6, wherein an interconnection of the plurality of additional nodes represents one or more dependencies between the plurality of additional nodes.

8. The method of claim 6, wherein the first set of training data further comprises:

a metric representing an efficiency of the additional service representative in performing the additional tasks.

9. The method of claim 6, wherein the first set of training data further comprises:

a metric representing a satisfaction of the additional customer upon the additional service representative performing the additional tasks.

10. The method of claim 6, wherein the first set of training data further comprises:

a metric representing a length of time of the additional electronic communication.

11. The method of claim 6, wherein the first set of training data further comprises:

a metric representing a satisfaction of the additional customer during the additional electronic communication.

12. The method of claim 6, wherein the first set of training data further comprises:

a metric representing a satisfaction of the additional customer upon completion of the electronic communication.

13. The method of claim 1, further comprising:

receiving input from the service representative representing one or more modifications to the node graph, and training the machine learning system based on the input.

14. The method of claim 13, wherein the one or more modifications comprise at least one of:

an addition of a node to the node graph, a deletion of a node of the node graph, or a rearrangement of the node graph.

15. The method of claim 13, wherein the one or more modifications comprise:

a re-labeling of one of the nodes of the first node type as the second node type.

16. The method of claim 13, wherein the one or more modifications comprise:

a re-labeling of one of the nodes of the second node type as the first node type.

17. The method of claim 1, wherein the electronic communication pertains to an insurance claim, and wherein the one or more first tasks and the one or more second tasks are respective tasks in processing the insurance claim by the service representative.

18. The method of claim 1, wherein the machine learning system comprises a neural network, wherein the neural network comprises a plurality of neurons and a plurality of interconnections between the plurality of neurons, wherein each of the neurons represents a respective numerical value, and wherein each of the interconnections between the plural of neurons represents a respective dependency between respective numerical values of respective interconnected neurons.

19. A system, comprising:

at least one processor; and a memory communicatively coupled to the at least one processor, the memory storing instructions which, when executed by the at least one processor, cause the at least one processor to perform operations comprising: receiving, during an electronic communication between a customer and a service representative, data representing the electronic communication;

providing the data to a machine learning system that is configured to generate a node graph based on the data, wherein the node graph comprises a plurality of nodes, including:

a first node type representing one or more first tasks to be performed by the service representative while the electronic communication is occurring, and a second node type representing one or more second tasks to be performed by the service representative subsequent to the electronic communication, and wherein interconnections between individual nodes among the plurality of nodes represent one or more dependencies between the respective interconnected nodes; and causing, while the electronic communication is occurring, at least a portion of the node graph to be presented to the service representative on a display of a computing device;

generating, based on the data and the node graph, one or more questions directed to the customer regarding the one or more first tasks;

causing at least some of the one or more questions to be presented to the service representative on the display of the computing device;

determining, based on the data, that the customer has provided an answer to the one or more questions during the electronic communication;

storing the answer in the memory communicatively coupled to the at least one processor, and;

modifying, the node graph based on the answer, wherein modifying the node graph comprises at least one of: indicating a completion of a task associated with a node of the node graph, deleting a node of the node graph, adding a node to the node graph, or rearranging the node graph.

20. One or more non-transitory computer-readable media storing instructions which, when executed by at least one processor, cause the at least one processor to perform operations comprising: receiving, during an electronic communication between a customer and a service representative, data representing the electronic communication;

providing the data to a machine learning system that is configured to generate a node graph based on the data, wherein the node graph comprises a plurality of nodes, including:

a first node type representing one or more first tasks to be performed by the service representative while the electronic communication is occurring, and a second node type representing one or more second tasks to be performed by the service representative subsequent to the electronic communication, and wherein interconnections between individual nodes among the plurality of nodes represent one or more dependencies between the respective interconnected nodes; and causing, while the electronic communication is occurring, at least a portion of the node graph to be presented to the service representative on a display of a computing device;

generating, based on the data and the node graph, one or more questions directed to the customer regarding the one or more first tasks;

causing at least some of the one or more questions to be presented to the service representative on the display of the computing device;

determining, based on the data, that the customer has provided an answer to the one or more questions during the electronic communication;

storing the answer in a memory communicatively coupled to the at least one processor, and;

modifying, the node graph based on the answer, wherein modifying the node graph comprises at least one of: indicating a completion of a task associated with a node of the node graph, deleting a node of the node graph, adding a node to the node graph, or rearranging the node graph.

\* \* \* \* \*